(12) United States Patent
Hamada et al.

(10) Patent No.: US 7,639,706 B2
(45) Date of Patent: Dec. 29, 2009

(54) DATA SYNCHRONIZED PLAYBACK APPARATUS

(75) Inventors: Koichi Hamada, Tokyo (JP); Muneaki Yamaguchi, Inagi (JP); Toru Yokoyama, Hachioji (JP); Yasuhiro Akiyama, Ome (JP); Masahiro Kageyama, Hino (JP)

(73) Assignee: Hitachi, Ltd., Tokyo (JP)

( * ) Notice: Subject to any disclaimer, the term of this patent is extended or adjusted under 35 U.S.C. 154(b) by 421 days.

(21) Appl. No.: 11/068,916

(22) Filed: Mar. 2, 2005

(65) Prior Publication Data

US 2005/0220130 A1    Oct. 6, 2005

(30) Foreign Application Priority Data

Mar. 30, 2004 (JP) ............................. 2004-097561
Jul. 2, 2004 (JP) ............................. 2004-196966

(51) Int. Cl.
*H04L 12/28* (2006.01)

(52) U.S. Cl. ....................................... 370/428; 370/230
(58) Field of Classification Search ................. 370/503; 375/373, 358, 240, 372; 369/47, 59
See application file for complete search history.

(56) References Cited

U.S. PATENT DOCUMENTS

| | | | | |
|---|---|---|---|---|
| 4,724,476 A | * | 2/1988 | Nakagawa et al. | 348/453 |
| 5,003,559 A | * | 3/1991 | Kanai et al. | 375/358 |
| 5,386,323 A | * | 1/1995 | Ishiwata et al. | 386/104 |
| 5,519,681 A | * | 5/1996 | Maeda et al. | 369/47.16 |
| 5,557,196 A | * | 9/1996 | Ujiie | 324/76.77 |
| 5,617,383 A | * | 4/1997 | Matsumoto et al. | 369/30.04 |
| 5,623,459 A | * | 4/1997 | Iwamura et al. | 369/126 |
| 5,767,845 A | * | 6/1998 | Oashi et al. | 715/209 |
| 5,831,955 A | * | 11/1998 | Arataki et al. | 369/47.32 |
| 5,875,354 A | * | 2/1999 | Charlton et al. | 710/61 |
| 5,929,921 A | * | 7/1999 | Taniguchi et al. | 348/484 |
| 6,041,161 A | * | 3/2000 | Okamoto et al. | 386/112 |
| 6,081,783 A | * | 6/2000 | Divine et al. | 704/500 |
| 6,157,645 A | * | 12/2000 | Shobatake | 370/395.41 |
| 6,185,172 B1 | * | 2/2001 | Nakazawa | 369/47.46 |
| 6,211,918 B1 | * | 4/2001 | Uwabata et al. | 348/458 |
| 6,275,537 B1 | * | 8/2001 | Lee | 375/240.28 |

(Continued)

FOREIGN PATENT DOCUMENTS

JP    9-261613    10/1997

(Continued)

OTHER PUBLICATIONS

Japanese Office Action, dated Jun. 16, 2009, issued in corresponding Japanese Patent Application No. 2004-196966, and its English translation.

*Primary Examiner*—Thong H Vu
(74) *Attorney, Agent, or Firm*—Antonelli, Terry, Stout & Kraus, LLP.

(57) ABSTRACT

A data synchronized playback apparatus comprises a buffer which stores streaming data, a buffer fill quantity measurement unit which measures the amount of streaming data stored in the buffer, a decoder which decodes the streaming data and sends decoded data to a D/A converter, a D/A converter which converts the decoded data to an analog signal, a clock generator which generates a clock signal with a frequency that changes according to the measured data quantity, and the digital/analog converter operates based on the clock signal generated by the clock generator.

5 Claims, 5 Drawing Sheets

U.S. PATENT DOCUMENTS

| | | | |
|---|---|---|---|
| 6,453,109 B1 * | 9/2002 | Yamamoto | 386/13 |
| 6,600,779 B1 * | 7/2003 | Sawada et al. | 375/233 |
| 6,611,537 B1 * | 8/2003 | Edens et al. | 370/503 |
| 6,711,228 B1 * | 3/2004 | Kato et al. | 375/376 |
| 6,724,430 B2 * | 4/2004 | Miyoshi et al. | 348/441 |
| 6,732,200 B1 * | 5/2004 | Aoki | 710/60 |
| 6,785,230 B1 * | 8/2004 | Ogata et al. | 370/230 |
| 6,801,591 B1 * | 10/2004 | Frencken | 375/373 |
| 6,917,247 B2 * | 7/2005 | Schoner | 331/18 |
| 7,236,431 B2 * | 6/2007 | Morimoto et al. | 369/6 |
| 7,295,578 B1 * | 11/2007 | Lyle et al. | 370/503 |
| 7,411,901 B1 * | 8/2008 | Alexander et al. | 370/230 |
| 2002/0126593 A1 * | 9/2002 | Okumura et al. | 369/47.5 |
| 2002/0177996 A1 * | 11/2002 | Cooper et al. | 704/205 |
| 2003/0002609 A1 * | 1/2003 | Faller et al. | 375/372 |
| 2004/0013065 A1 * | 1/2004 | Udagawa | 369/47.51 |
| 2004/0068482 A1 * | 4/2004 | Yoshida et al. | |
| 2006/0120243 A1 * | 6/2006 | Kurita | 369/59.19 |

FOREIGN PATENT DOCUMENTS

| | | |
|---|---|---|
| JP | 2000-122681 | 4/2000 |
| JP | 2002-165148 | 6/2002 |
| JP | 2004-072217 | 3/2004 |

* cited by examiner

DATA SYNCHRONIZED PLAYBACK APPARATUS

CLAIM OF PRIORITY

The present application claims priority from Japanese application JP2004-097561 filed on Mar. 30, 2004 and JP2004-196966 filed on Jul. 2, 2004, the content of which is hereby incorporated by reference into this application.

BACKGROUND OF THE INVENTION

The present invention relates to a data synchronized playback apparatus for playing back audio and/or video data without interruptions or cutoffs even when unable to synchronize with the transmitting side during playback such as audio or video data sent for example via a transmission path from the transmitting side.

FIELD OF THE INVENTION

In multiplex streaming technologies, a system reference clock is generally encoded and sent in order to recreate the system time on the transmitting side (multiplex apparatus). This system reference clock is called an SCR (System Clock Reference) when used for MPEG-2 program streams. The system reference clock is called a PCR (Program Clock Reference) when used for MPEG-2 transport streams. The correct playback of the multiplexed data can be guaranteed as long as the time can be managed by means of the system time generated by these system reference clocks SCR and PCR (Refer to ISO/IEC 13818-1, "Information technology—Generic coding of moving pictures and associated audio information: Systems").

However, when the clock frequency on the receiving side is different from the transmitting side, the system time cannot be recreated so data inequalities (too much/too little) occur in the data. When the clock frequency on the transmitting side is higher than on the receiving side, or in other words when the elapsed system time on the transmitting side is faster than on the receiving side, the data cannot be processed on the receiving side so the surplus data causes an overflow in the receive buffer. Conversely, when the clock frequency on the transmitting side is lower than on the receiving side, or in other words when the elapsed system time on the transmitting side is slower than on the receiving side, then there is insufficient data on the receiving side causing an underflow in the receive buffer. To prevent these types of data inequalities, in MPEG-2 a PLL (Phase Locked Loop) is utilized to sort and reproduce the multiplexed data by synchronizing the clock frequencies on the transmitting side and receiving side.

An apparatus for playing back audio data without interruptions even when synchronization with the transmitting side is impossible is disclosed for example in JP 2000-122681 A. In the method disclosed in JP 2000-122681 A, the quantity of audio data output from the audio buffer is corrected based on results comparing the full quantity of audio data stored by the audio buffer with its expected value. However, this method requires a means for calculating the expected value of the audio buffer, and a means for interpolating data for correcting the data quantity, as well as a means for thinning out the data so there is a high processing load that makes it necessary to find a simpler method.

One such technology measures the quantity of audio data accumulated in the audio buffer and adjusts the clock frequency supplied to the AV decoder according to that quantity of accumulated audio data (refer to JP 9-261613 A and JP 2002-165148 A).

SUMMARY OF THE INVENTION

In some cases, the transmitting side and receiving side cannot synchronize with each other since there is no PLL circuit due to hardware limitations, or because the frequency does not sufficiently match with the transmitting side even if equipped with a PLL circuit. In such cases, the problem occurs that the audio and/or video data sent along the transmission path from the transmitting side cannot be played back correctly.

In view of the above problems with the related art, this invention has the object of providing a data synchronized playback apparatus capable of playing back audio and/or video data without interruptions or cutoffs even for example when unable to synchronize with the transmitting side during playback of audio or video data sent via a transmission path from the transmitting side.

The related art disclosed in JP 9-261613 A and JP 2002-165148 A has the problem that a change in the clock frequency supplied to the AV decoder, alters the performance of the entire apparatus when the AV decoder is comprised of software.

This invention therefore has the object of preventing a change in performance of the entire apparatus, even when the AV decoder is comprised of software.

This invention provides a data synchronized playback apparatus including, a buffer which stores the streaming data, a buffer fill measurement unit which measures the amount of streaming data stored in the buffer, a decoder which decodes the streaming data and sends decoded data to a digital/analog converter, and a digital/analog converter which converts the decoded data to an analog signal, a clock generator which generates a clock signal with a frequency that changes according to the measured data quantity, and the digital/analog converter operates based on the clock signal generated by the clock generator.

This invention corrects the output speed of audio data and/or video data output from the audio buffer and/or video buffer based on the audio data and/or video data fill quantity held in the audio buffer and/or video buffer and so is capable of playing back audio data and/or video data without interruptions when impossible to synchronize with the transmitting side, for example when playing back audio data and/or video data sent via a transmission path from the transmitting side.

This invention is capable of preventing a change in the performance of the overall apparatus, even when the AV decoder is comprised of software.

The embodiments of this invention are described next while referring to the drawings.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

First Embodiment

Figure 1:
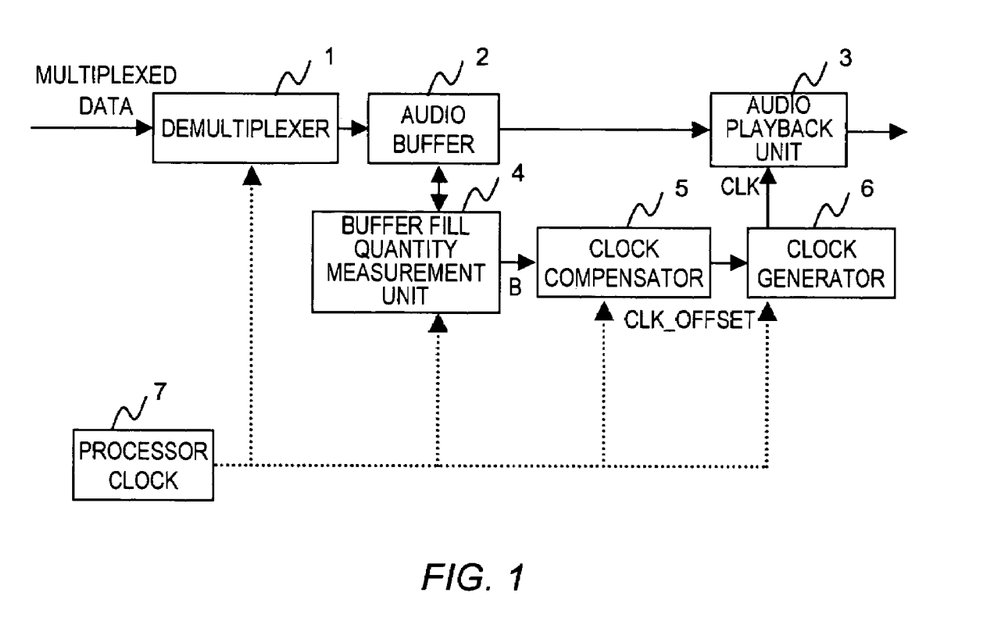
FIG. 1 is a block diagram showing the audio data synchronized audio playback apparatus of the first embodiment.

A first embodiment of the audio data synchronized playback apparatus is shown in the block diagram of FIG. 1.

In FIG. 1, the demultiplexer 1 demultiplexes the multiplex data sent via the transmission path and sends only the audio data to the audio buffer 2. The audio data output from the audio buffer 2 is played back by the audio playback unit 3 driven at a clock frequency generated by the clock generator 6 that supplies a clock based on the control data from the clock compensator 5 and the buffer fill measurement unit 4 described later. The clock generator 6 generates clock pulses for driving the audio playback unit 3. Clocks for other than the audio playback unit 3 are each driven from the processor clock 7 which is separate and not related to the clock generator 6.

The buffer fill measurement unit 4 measures the amount of audio data stored in the audio buffer 2 and sends that value to the clock compensator 5.

The clock compensator 5 corrects the clock frequency of the clock generator 6 that generates clock utilized in the audio playback unit 3. For example, when the output frequency of the clock compensator 5 is CLK_OFFSET(Hz), and when the output frequency of the clock generator 6 is CLK_BASE(Hz) when the CLK_OFFSET=0, then the clock generator 6 generates a clock at a frequency of CLK_BASE+CLK_OFFSET (Hz). The clock offset value is positive or negative or zero (0).

When the buffer fill unit quantity exceeds a particular threshold, the clock compensator 5 sends a control signal to the clock generator 6 to rise up the clock frequency. Conversely, when the buffer fill quantity falls below particular threshold, the clock compensator 5 sends a control signal to the clock generator 6 to fall down the clock frequency. These thresholds may be a single threshold or multiple thresholds.

For example, when the buffer fill quantity exceeds a particular threshold, and a control signal is sent to the clock generator 6 for rising up the clock frequency, the clock frequency of the audio playback unit 3 becomes higher, and data is output from the audio buffer 2 to the audio playback unit 3 at a faster data speed. The buffer fill quantity consequently decreases and a buffer overflow can be avoided.

Conversely, when the buffer fill quantity falls below a particular threshold, and a control signal is sent to the clock generator 6 for falling down the clock frequency, the clock frequency of the audio playback unit 3 becomes lower, and data is output from the audio buffer 2 to the audio playback unit 3 at a slower data speed. The buffer fill quantity consequently increases and a buffer underflow can be avoided.

Figure 2:
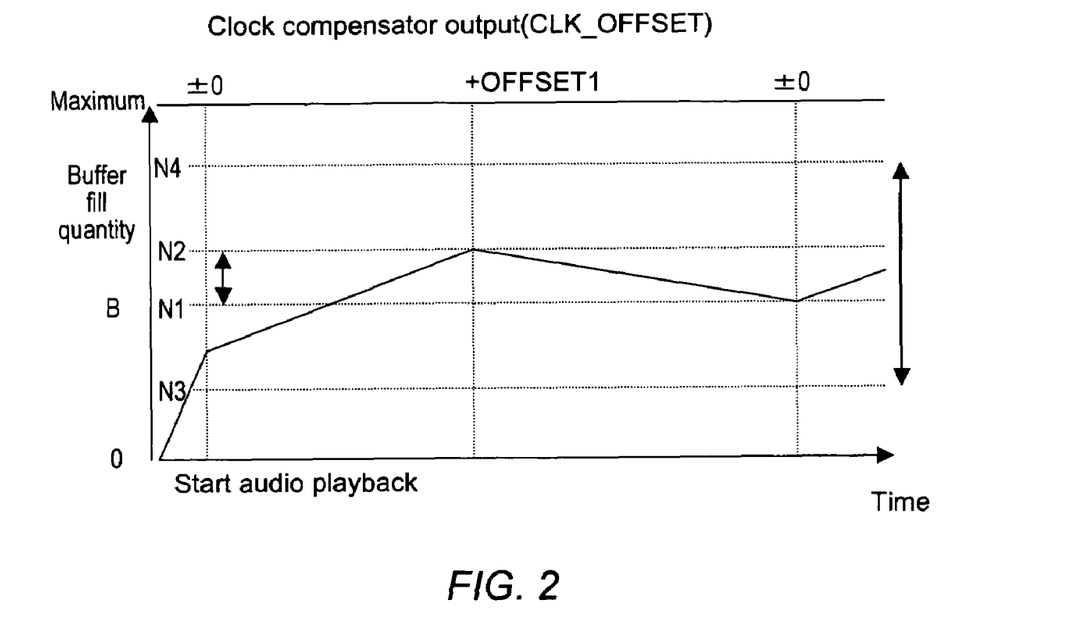
FIG. 2 is a graph showing changes over time in the audio buffer fill quantity and the clock compensator in the first embodiment.

FIG. 2 is a graph showing changes over time in the output of the clock compensator and audio buffer fill quantity in the first embodiment of this invention. The horizontal axis is the time and the vertical axis is the buffer fill quantity B. Taking the buffer fill quantity as B, then B can be assumed to fall within the range N1<B<N2. The inequalities in this formula may contain equalities.

When data is sent from this transmit path and the buffer fill quantity of the audio buffer 2 reaches a certain value, the audio playback unit 3 starts, and data is output from the audio buffer 2. Here, the output clock frequency in the recorded audio data is CLK_ORG, and the output frequency of the clock compensator 5 is CLK_OFFSET. The output frequency of the clock generator 6 when the CLK_OFFSET is zero (0), is CLK_BASE.

When the CLK_ORG>CLK_BASE or in other words when the clock frequency of the clock generator 6 is lower than the specified audio data clock frequency, then the buffer fill quantity B increases and exceeds the boundary N2. The clock compensator 5 detects that the buffer fill quantity exceeded N2, and outputs a signal to raise the clock frequency. If the offset amount output from the clock compensator 5 at this time is set as OFFSET1, then the CLK_OFFSET=OFFSET1 (Hz) is added to the clock frequency of the clock generator 6 so that the clock becomes CLK=CLK_BASE+OFFSET1.

Here, when CLK>CLK_ORG, the buffer fill quantity B decreases and on reaching N1, the clock compensator 5 outputs CLK_OFFSET=0 and the CLK once again equals the CLK_BASE. By repeating this clock frequency compensation, the buffer fill quantity can be kept at a value within a particular range.

Moreover, in case the buffer does not decrease just by adding an OFFSET1, in other words, when CLK_ORG>CLK_BASE+OFFSET1, then the clock compensator 5 checks a plurality of values such as N3, N4 of the clock fill quantity. If the buffer fill quantity for example has not reached N4, then the clock compensator 5 performs processing to make CLK_OFFSET=2×OFFSET1.

The above clock compensator 5 operation is only an example and just compensating the output frequency of the clock generator 6 according to the size of the buffer fill quantity is sufficient.

Second Embodiment

Video data can be played back without interruption even when impossible to synchronize with the transmitting side, by changing the clock operation of the video playback unit using the same method as the processing of the audio data described in the first embodiment.

Figure 3:
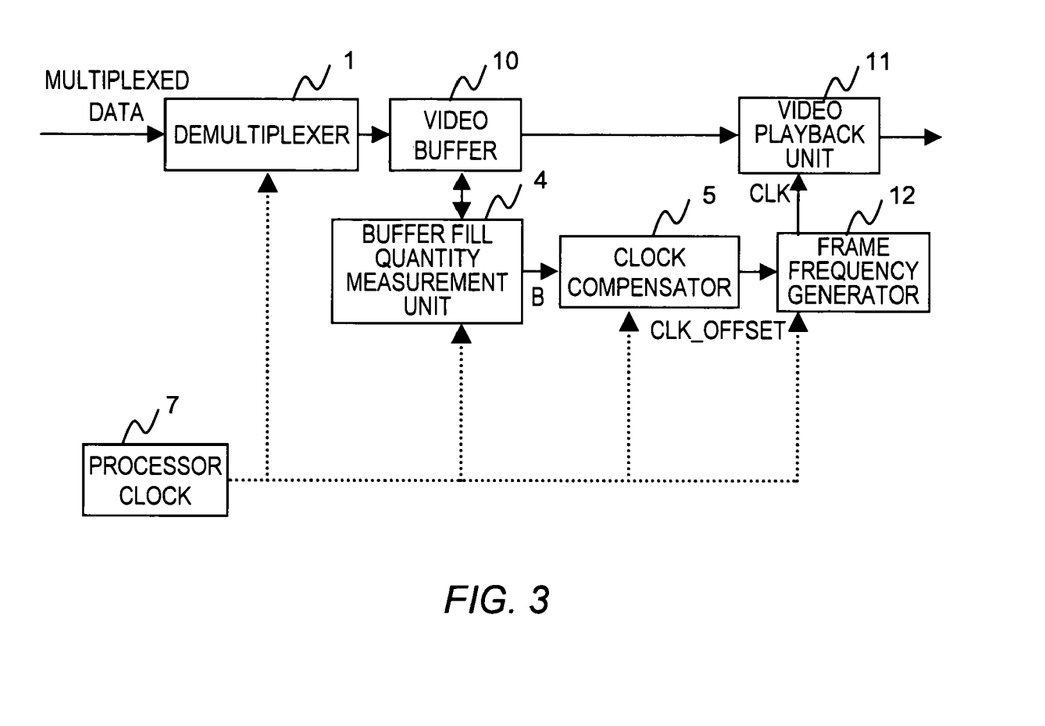
FIG. 3 is a block diagram showing the video data synchronized playback apparatus of the second embodiment.

FIG. 3 is a block diagram showing the video data synchronized playback apparatus of the second embodiment of this invention. In this embodiment, rather than the clock operation of the video playback unit, only the display frame frequency of the video data is changed. When handling video data, there is no need to correct the clock in pixel units. Instead, only the actually displayed frame frequency need be changed according to the video buffer fill quantity. If the video playback unit 11 acquires the data needed for a display from the video buffer 10, then the speed that data is output from the video buffer 10 can be corrected just by correcting only the display frame frequency.

This means for correcting the display frame frequency according to the video buffer fill quantity, is identical to the means described for the audio buffer in the first embodiment.

Third Embodiment

Figure 4:
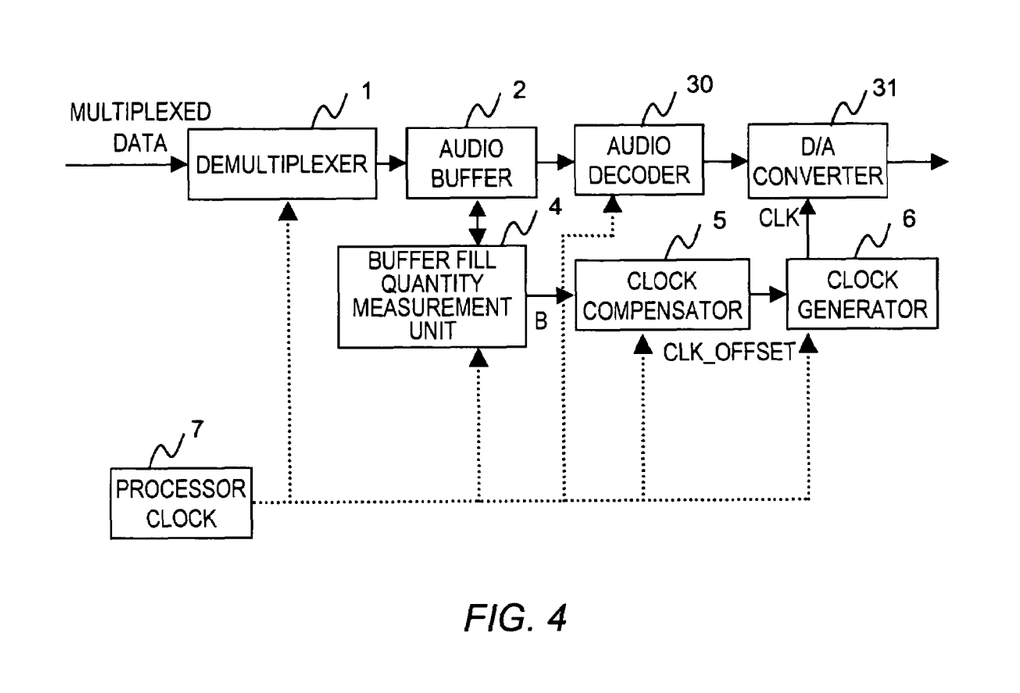
FIG. 4 is a block diagram showing the audio data synchronized playback apparatus of the third embodiment.

FIG. 4 is a block diagram showing the audio data synchronized playback apparatus of the third embodiment of this invention.

In the audio data playback apparatus of the third embodiment, the audio playback unit 3 of the previously described audio data playback apparatus of the first embodiment comprises an audio decoder 30 and a digital/analog converter (D/A converter) 31.

The demultiplexer 1 demultiplexes the multiplex data sent via the transmission path, and sends only the audio data to the audio buffer 2. The audio buffer 2 temporarily stores this audio data.

The buffer fill measurement unit 4 measures the amount of audio data (buffer fill quantity) stored in the audio buffer 2 and sends the measurement results to the clock compensator 5. The clock compensator 5 corrects the clock frequency of the clock generated by the clock generator 6. This compensation method is the same as described in the first embodiment. The clock compensator 5 determines a compensation amount (CLK_OFFSET) according to the buffer fill quantity of the audio buffer 2, and inputs that CLK_OFFSET) to the clock generator 6.

The clock generator 6 generates a clock with a CLK_BASE of a fixed frequency. The clock compensator 5 modifies the clock frequency. The clock generator 6 supplies the clock pulse of the frequency-corrected CLK_BASE+CLK_OFFSET to the D/A converter 31. The clock generator 6 finds the counter value of a clock (for example, a processor clock generator 7) with a frequency higher than the clock supplied to the D/A converter 31, and generates a clock by changing the counter value that was found. Since the clock generator 6 can generate a clock in this way, there is no need to install hardware such as a voltage controlled oscillator (VCO).

The processor clock generator 7 generates a clock for driving the entire audio data synchronized playback apparatus. The processor clock generator 7 supplies this clock to the demultiplexer 1, the buffer fill measurement unit 4, clock compensator 5, clock generator 6 and the audio decoder 30.

The audio decoder 30 extracts from the audio buffer 2, the audio data in a quantity required by the D/A converter 31. The audio decoder 30 then decodes the extracted audio data and sends it to the D/A converter 31. The clock supplied from the clock generator 6 drives the D/A converter 31. The D/A converter 31 converts that received audio data to analog signals and reproduces them as music.

In the related art, the clock whose frequency was changed is supplied to the audio decoder 30. When the audio decoder 30 is software, the speed of other software also changes because that other software operates on the same processor as the audio decoder 30. The related art therefore has the problem that the performance of the overall apparatus changes and causes adverse effects.

In the third embodiment on the other hand, the clock generator 6 supplies a clock to the D/A converter 31. The clock generated by the processor clock 7 drives the audio decoder 30. The audio decoder 30 is therefore not susceptible to effects from changes in the clock supplied to the D/A converter 31 so there is no change in the performance of the overall apparatus.

Fourth Embodiment

Figure 5:
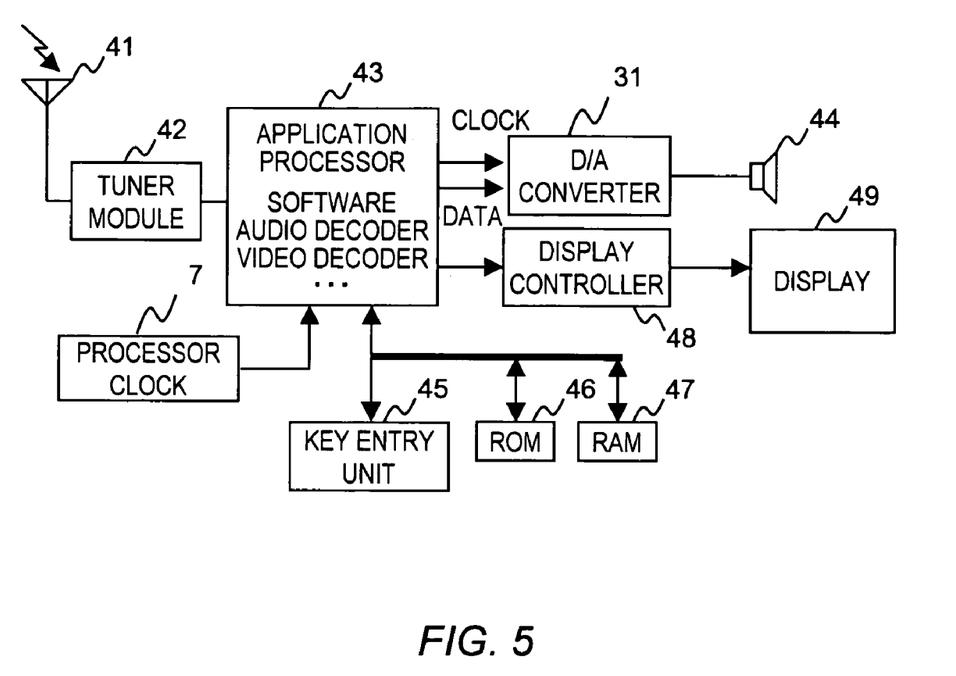
FIG. 5 is a block diagram showing the terminal of the fourth embodiment.

FIG. 5 is a block diagram showing the terminal of the fourth embodiment of this invention.

Other than the digital broadcast antenna 41 and the tuner module 42, the structural elements of the terminal of the fourth embodiment are identical to the structural elements terminals of the known art such as cellular telephones. In other words, in the fourth embodiment, a digital broadcast antenna 41 and a tuner module 42 are added to a terminal of the known art such as a cellular telephone. Digital broadcasts can then be received by adding software to the application processor 43.

The digital broadcast antenna 41 receives radio waves of the digital broadcast from a base station and sends them to the tuner module 42. The tuner module 42 demodulates the received radio waves into a digital signal and sends it to the application processor 43.

The application processor 43 includes a demultiplexer 1, a buffer fill measurement unit 4, a clock compensator 5 and a clock generator 6. A key entry unit 45, a ROM 46 and a RAM 47 are connected to the application processor 43. The key entry unit 45 sends the user input (for example, a channel change) to the application processor 43 and receives signals from the application processor 43. The ROM 46 stores programs for processing executed on the application processor 43. The RAM 47 is a memory that the application processor 43 requires executing the processing, and includes the audio buffer 2.

The application processor 43 that received the digital signals, starts the processing using the demultiplexer 1. The remainder of the processing is identical to the third embodiment so a description is omitted here. The application processor 43 changes the frequency of the clock supplied to the D/A converter 31 according to the amount of data recorded in the audio buffer 2 in RAM 47.

The terminal of the fourth embodiment can in this way output the audio data from the speaker 4 without interruptions. Moreover, there is no change in the performance of the overall apparatus since the application processor 43 is driven by a processor clock 7 not synchronized with the clock of the broadcast station. There is also no need to synchronize the processor clock 7 with the broadcast station clock.

The application processor 43 can also synchronize the video with the audio and output this to the display controller 48 using the technology of the known art to output the video data by referring to the timing for D/A conversion of the audio data. The display controller 48 drives the display 49 by utilizing the received video data. The display 49 may for example be a liquid crystal display (LCD) for displaying the video.

The terminal of the fourth embodiment also includes other structural elements (for example, a configuration utilized in voice calls) of terminals of the known art such as cellular telephones however, structural elements not utilized for receiving digital signals are omitted from the drawings and the description.

By applying this invention, the terminal of this type such as for cellular telephones can therefore play back digital broadcasts even without an apparatus for synchronizing with the system clock on the transmitting side in broadcast stations possessing general-purpose digital broadcast/receiving equipment.

This invention is therefore capable of receiving digital broadcasts when utilized in cellular terminals since clock synchronization can be achieved without a drop in the overall apparatus performance.

While the present invention has been described in detail and pictorially in the accompanying drawings, the present invention is not limited to such detail but covers various obvious modifications and equivalent arrangements, which fall within the purview of the appended claims.

What is claimed is:

1. A data outputting or reproducing apparatus comprising:
a buffer which stores streaming data;
a buffer fill quantity measurement unit which measures the amount of streaming data stored in the buffer;
a decoder which decodes the streaming data and sends decoded data to a digital/analog converter;
a digital/analog converter which converts the decoded data to an analog signal;

a first clock generator which generates a clock signal at a first frequency;

a digital/analog converter clock generator which generates a clock signal with a second frequency that is separate from the clock signal generated by the first clock generator and changes according to the measured amount of streaming data stored in the buffer;

wherein:
the decoder operates based on the clock signal generated by the first clock generator,
the digital/analog converter operates based on the clock signal generated by the digital/analog converter clock generator, and
reproduction of streaming data occurs without a PLL circuit.

2. A data outputting or reproducing apparatus comprising:
a decoder which decodes the streaming data and sends decoded data to a digital/analog converter;
a digital/analog converter which converts the decoded data to an analog signal;
a first clock generator which supplies a clock signal to the decoder; and
a digital/analog converter clock generator which supplies a clock signal to the digital/analog converter at a frequency separate from the clock signal generated by the first clock generator, and
wherein reproduction of streaming data occurs without a PLL circuit.

3. A data synchronized playback apparatus according to claim 2, comprising:
a buffer which stores streaming data; and
a buffer fill quantity measurement unit which measures the amount of streaming data stored in the buffer,
wherein the clock generator generates a clock signal with a frequency changed according to the data quantity measured by the buffer fill quantity measurement unit, and supplies the clock signal to the digital/analog converter.

4. A terminal for outputting or reproducing received streaming data comprising:
a data reception unit which receives streaming data;
a buffer which stores the streaming data;
an application processor which executes an application program;
a processor clock generator which supplies a clock signal to the application processor;
a digital/analog converter for converting audio data to analog signals; and
an audio output unit for outputting audio,
wherein the application processor executes an application program based on the clock signal generated by the processor clock generator,
wherein the application processor measures the quantity of streaming data stored in the buffer, and generates a clock signal with a frequency that is separate from the clock signal generated by the processor clock generator and is changed according to the measured amount of streaming data stored in the buffer,
wherein digital/analog converter operates based on the clock signal generated by the application processor, and
wherein reproduction of streaming data occurs without a PLL circuit.

5. A terminal according to claim 4 comprising:
a display unit which displays video; and
a display controller which controls the display unit,
wherein the application processor sends the video data to the display controller so that the video can be displayed on the display in synchronization with the audio outputted by the audio output unit.

* * * * *